Dec. 2, 1941.    R. B. SMITH ET AL    2,264,486
CAKE CUTTER AND SERVER
Filed Jan. 29, 1940
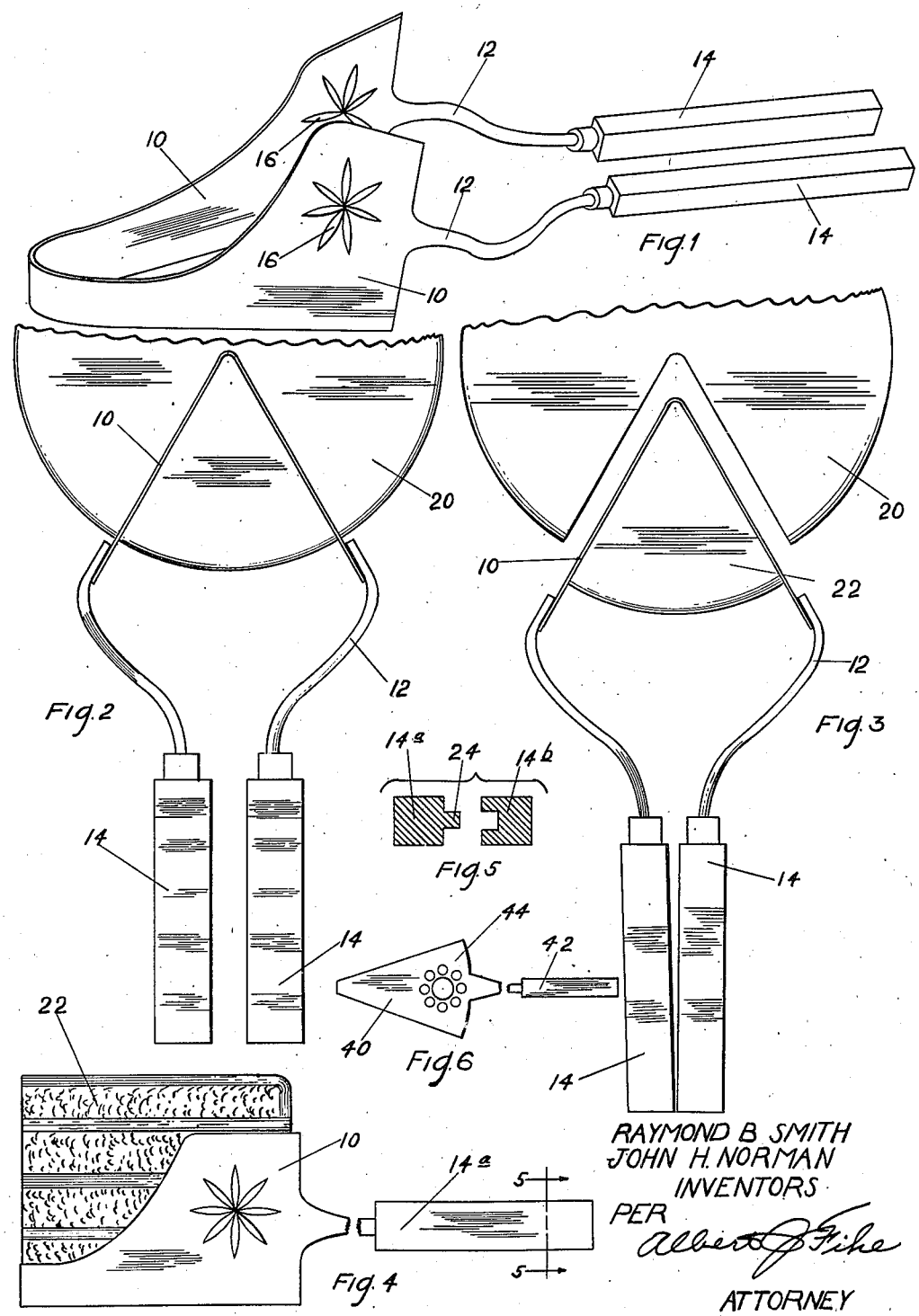
RAYMOND B. SMITH
JOHN H. NORMAN
INVENTORS
PER
ATTORNEY

Patented Dec. 2, 1941

2,264,486

UNITED STATES PATENT OFFICE 2,264,486

CAKE CUTTER AND SERVER

Raymond B. Smith and John H. Norman, Elmhurst, Ill.

Application January 29, 1940, Serial No. 316,182

6 Claims. (Cl. 30—114)

This invention relates to an improved cake cutter and server and has, for one of its principal objects, the provision of a simple yet efficient device by means of which a cake, pie or the like can be conveniently cut into portions and also as conveniently served without any danger of spoiling the appearance of the slices or upsetting the same.

One of the important objects of this invention is the provision of a cutter and server for cakes, pies or the like which is composed of a minimum of parts; in fact, practically all one piece which can be simply and economically manufactured and which, furthermore, can be made of almost any suitable material and in many grades from an expensive device to one relatively cheap.

A further object of the invention is the provision of a cutter and server for pastries, and particularly cakes, which will readily and efficiently cut the cake into convenient uniform pieces and without tearing or marring the appearance of the slices no matter how tender the cake and which, moreover, can be easily cleaned and, when not in use, will not be likely to spoil or deface a cloth or table.

Other and further important objects of the invention will be apparent from the disclosures in the accompanying drawing and following specification.

The invention, in a preferred form, is shown in the drawing and hereinafter more fully described.

In the drawing:

Figure 1 is a perspective view of the improved cake cutter and server of this invention, showing a preferred form.

Figure 2 is a top elevation of a cake, illustrating the cutter about to sever a slice of the cake.

Figure 3 is a view similar to Figure 2, showing the slice cut and being removed from the remainder of the cake.

Figure 4 is a side elevation of the device of this invention, showing the same as holding a slice of cut cake for serving.

Figure 5 is a sectional view taken on the line 5—5 of Figure 4, and illustrating a slight modification of the invention.

Figure 6 shows a further modified form.

As shown in the drawing:

The reference numeral 10 indicates the cutting elements of the improved cake cutter and server of this invention, each of the same comprising a blade-like element made integral with each other and with a rather sharp bend at their forward portions to provide an angular relationship corresponding to the usual size of cake slice or section of pie.

It will be noted that these cutting elements are tapered downwardly toward the front but have wider portions at the rear, this providing a better cutting action so far as the cake is concerned and a better gripping action with respect to the resultant slice when the same is removed from the cake.

Rearward extensions 12 are provided on the blade elements 10, and these may be either integral with or fastened thereto in some convenient manner, and handle elements 14 are applied to these extensions, all as best shown in Figure 1.

The wide portions of the blade elements 10 may be perforated in some ornamental design as illustrated at 16, thereby providing a better cutting of a cake section and, at the same time, add to the attractive appearance of the item.

As best shown in Figure 2, the device is applied to the top of a cake or pie 20 extending approximately to its middle with the blades and handles in the position shown, the material of the blades being of stainless steel or some such material whereby some resiliency is afforded, and the handle elements are accordingly normally maintained spaced from each other and in approximately parallel relationship as illustrated in Figures 1 and 2.

After the slice 22 has been severed from the remainder of the cake as illustrated in Figure 3, the handles 14 are brought together as shown in this figure by means of pressure of the hands or fingers of the operator, and due to the resilient action of the blade elements 10, the rear portions of the handles 14 will contact each other first, all as best shown in Figure 3, and the slices of cake 22 will be accordingly slightly compressed between the blade portions 10, the widest portions of the blades acting against the thicker portion of the wedge of cake as best shown in Figure 4. This action will suitably retain the slice of cake 22 enabling it to be readily separated from the remainder of the cake or pie and also enabling it to be readily transported to another dish or served in any other manner as desired without any danger of spilling, upsetting or loss.

In Figure 5, the modified handles 14a and 14b are shown as provided with a matching tongue and groove combination 24 and 26 respectively, the tongue 24 fitting loosely into the groove 26 and effectively preventing any undesirable sidewise relative slippage between the handle portions when the same are forced into cake slice gripping position shown in Figure 3. This tongue and groove arrangement is preferably at the rear ends only of the handles but may extend through their entire length.

Other means may be provided for maintaining the handles in desired relationship during the cutting and serving operation, and it will be evident that other types of handles may be employed and the connections of the same to the blades varied as desired or convenient.

In Figure 6, each of the blades 40 is shown as having two cutting edges, both tapering toward the front, the angular relationship of the blades being the same as that shown in the other figures and the handles 42 being also similar to the handles 14. An ornamental design 44 which also assists in the cutting action is incorporated into the blades 40 as shown.

It will be seen that herein is provided a simple yet efficient cake and pie cutter and server which, in addition to assuring uniform slices, will also avoid the embarrassment of unshapely portions or accidental upsetting of served pieces of pastry.

The device can be made of any suitable material, preferably metal punching from relatively cheap material such as stainless steel, silver or gold, and obviously plating or other ornamentation may be applied depending upon the particular class of customer. This also applies to the handle construction which may be some molded plastic or some other material ranging from wood to precious metals.

We are aware that many changes may be made and numerous details of construction varied throughout a wide range without departing from the principles of this invention, and we, therefore, do not propose limiting the patent granted hereon otherwise than as necessitated by the prior art.

We claim as our invention:

1. A pastry cutter and server, comprising a unitary blade portion formed in two segments joined at their forward end and diverging rearwardly, together with a handle on each segment and extending rearwardly therefrom.

2. A pastry cutter and server, comprising a unitary blade portion formed in two segments joined at their forward end and diverging rearwardly, together with a handle on each segment and extending rearwardly therefrom, the material of the blade portions being sufficiently resilient to normally maintain the handle portions in separated relationship, while allowing of an inward forcing of the handles into contact whereby the distance between the rear ends of the blade portions is shortened, and a cut piece of pastry may be retained in clamped position between the blades for transporting and serving purposes, and means on the handles for retaining the same in desired juxtaposed relationship during the clamping and serving operation.

3. A pastry cutter and server, comprising a unitary blade portion formed in two segments, joined at their forward end and diverging rearwardly, together with a handle on each segment and extending rearwardly therefrom, the material of the blade portions being sufficiently resilient to normally maintain the handle portions in separated relationship, while allowing of an inward forcing of the handles into contact whereby the distance between the rear ends of the blade portions is shortened, and a cut piece of pastry may be retained in clamped position between the blades for transporting and serving purposes, and means on the handles for retaining the same in desired juxtaposed relationship during the clamping and serving operation, said means comprising opposed flattened surfaces on the handles, a tongue extending longitudinally of one handle and a corresponding groove extending longitudinally on the face of the other handle.

4. A cake cutter and server, including, in combination, a pair of integrally joined blade elements, the point of juncture being at the forward end and characterized by narrow strips, the blades diverging angularly rearwardly and sloping upwardly to provide widened portions at the rear.

5. A cake cutter and server, including, in combination, a pair of integrally joined blade elements, the point of juncture being at the forward end and characterized by narrow strips, the blades diverging angularly rearwardly and sloping upwardly to provide widened portions at the rear and handles for manipulating the blade elements.

6. A cake cutting and handling device, comprising a pair of blades, each blade in substantially the form of an isosceles triangle connected at the front and diverging rearwardly, a handle for each blade, and means connecting the handles to the blades whereby the handles are normally in substantially parallel relationship.

RAYMOND B. SMITH.
JOHN H. NORMAN.